Aug. 8, 1950 T. K. CROSSLAND 2,517,847
COASTER BRAKE
Filed Dec. 27, 1948 2 Sheets-Sheet 1

Inventor
THEODORE K. CROSSLAND
By Caswell & Legaard
Attorney

Aug. 8, 1950     T. K. CROSSLAND     2,517,847
COASTER BRAKE
Filed Dec. 27, 1948     2 Sheets-Sheet 2
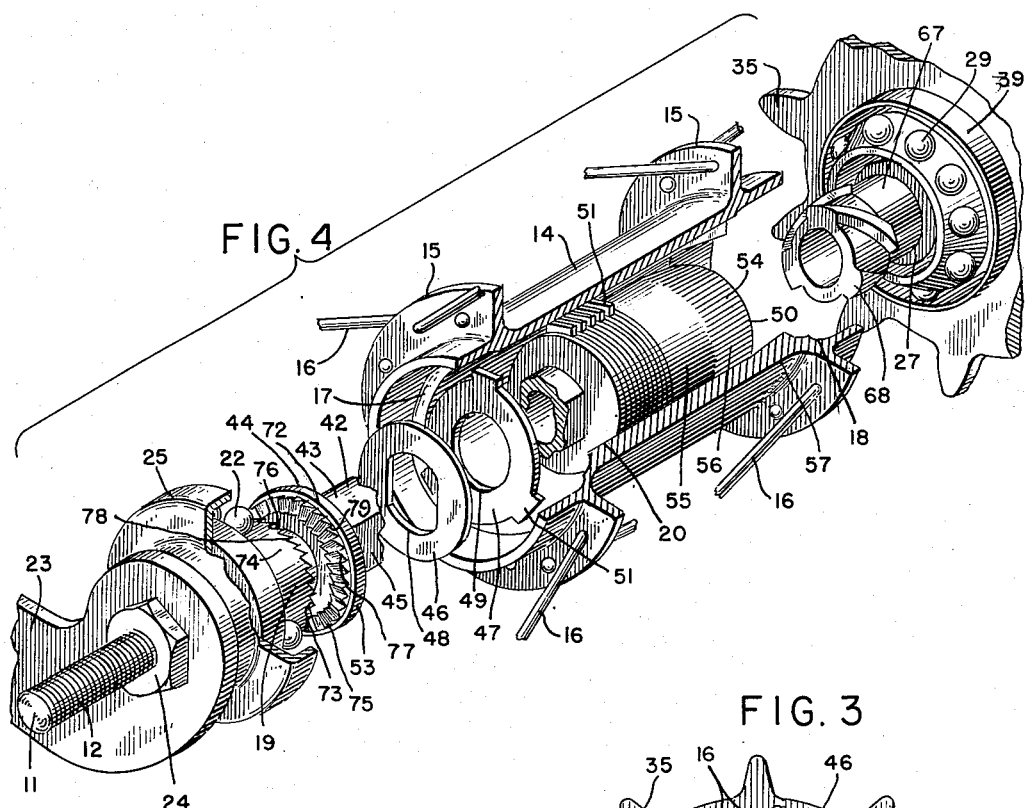
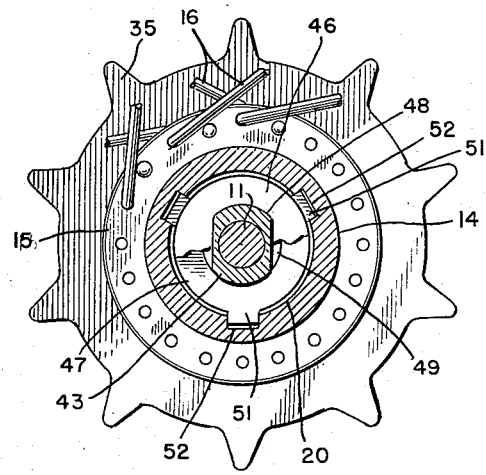
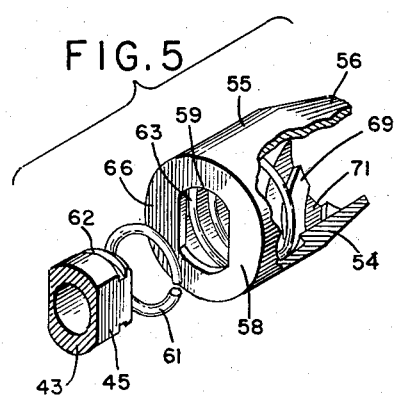
Inventor
THEODORE K. CROSSLAND
By Caswell & Lagaard
Attorney Patented Aug. 8, 1950

2,517,847

UNITED STATES PATENT OFFICE 2,517,847

COASTER BRAKE

Theodore K. Crossland, Minneapolis, Minn.

Application December 27, 1948, Serial No. 67,418

3 Claims. (Cl. 192—6)

My invention relates to coaster brakes for bicycles and has for an object to provide a coaster brake in which friction is reduced to a minimum during pedaling of the bicycle.

Another object of the invention resides in providing a coaster brake in which the usual drag spring is eliminated.

A still further object of the invention resides in constructing the coaster brake with a clutch member and with a brake disc carrier and in mounting said parts for rotation as a unit.

A still further object of the invention resides in arranging the clutch member and disc carrier for limited relative axial movement and in further providing stop means for limiting the movement of said parts away from one another.

Another object of the invention resides in providing a spline between said clutch member and carrier and in further providing resilient means urging the clutch member and disc carrier apart.

An object of the invention resides in providing a brake anchor fixed relative to the wheel axle and in providing locking means between said brake anchor and disc carrier.

A still further object of the invention resides in providing the coaster brake with a driver having helical threads thereon and said clutch member with a nut for engagement with said threads and in further constructing said locking means with meshing teeth said teeth being provided with helical surfaces having the same hand and lead as the hand and lead of said threads.

Other objects of the invention reside in the novel combination and arrangement of parts and in the details of construction hereinafter illustrated, and/or described.

In the drawings:

Fig. 3 is a sectional view taken on line 3—3 of Fig. 1.

Fig. 4 is a perspective view of the parts of the hub assembly detached from one another and with parts broken away and with other parts shown in section.

Fig. 5 is a view similar to Fig. 4 of other parts of the invention.

Figure 1:
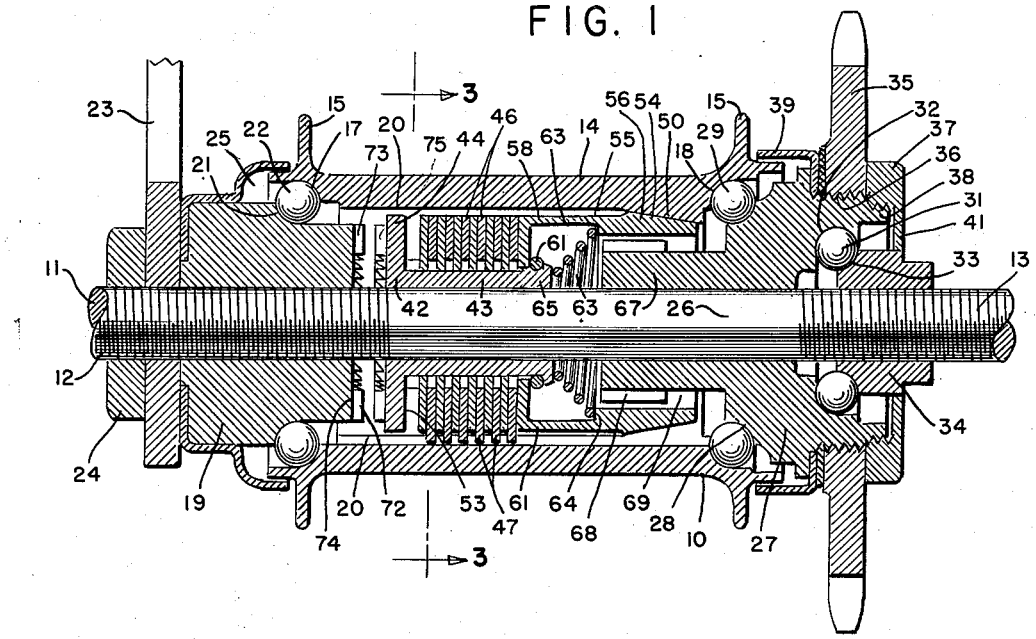
Fig. 1 is a plan sectional view drawn to an enlarged scale of the rear wheel hub assembly of a bicycle taken at the axis of the axle and illustrating a coaster brake embodying my invention.

For the purpose of illustrating the invention I have shown in the drawings a hub assembly for the rear wheel of a bicycle and which is designated by the reference numeral 10. This hub assembly includes an axle 11 having threads 12 and 13 at its end and which may be attached to the frame of a bicycle in the usual manner by means of nuts screwed on said threads but not shown in the drawings. Encircling the axle 11 is a hub 14, tubular in form having a bore 20 therein and which is formed with flanges 15 at its ends and to which the spokes 16 of the wheel are attached. The hub 14 has ball races 17 and 18 at its ends. At the left hand end of the hub 14 as viewed in Fig. 1 is a brake anchor 19 in the form of a ball bearing cone which is formed with a ball race 21 facing the race 17. In these races are balls 22 which support one end of the hub 14 for rotation. The brake anchor 19 functions in a manner to be presently described and has secured to it the usual brake arm 23 which is attached in the usual manner to the bicycle frame. A lock nut 24 screwed on the threads 12 of axle 11 holds the parts assembled. A guard 25 is clamped between the brake arm 23 and the brake anchor 19 and keeps dirt out of the ball bearing formed by the balls 22 and the ball races 17 and 21.

Rotatably mounted on the intermediate portion 26 of axle 11 is a driver 27. This driver has a ball race 28 which faces the ball race 18. In these races are balls 29 which rotatably support the other end of the hub 14. The driver 27 is itself supported for rotation relative to the axle 11 by means of balls 31 which are received in ball races 32 and 33 formed respectively in the driver 27 and in a ball cone 34 screwed on the threads 13 of axle 11. The driver 27 has secured to it a sprocket wheel 35 which is screwed on the threads 36 formed on said driver. This sprocket wheel is held in place on the driver 27 by means of a lock nut 37 which is screwed on other threads 38 on said driver and preferably of a hand opposite the hand of the threads 36. A guard 39 is clamped between the sprocket wheel 35 and the driver 27 and prevents dirt from entering the ball bearing formed by the balls 29 and the races 18 and 28. In a similar manner a flange 41 formed on the nut 37 forms a guard for the ball bearing formed by the balls 31 and the races 32 and 33.

The brake mechanism of the invention is of the disc type and includes a brake disc carrier 42. This carrier is rotatably and slidably mounted on the portion 26 of axle 11 and comprises a tubular portion 43 with a collar 44 issuing outwardly therefrom. The tubular portion 43 has two flats 45 formed thereon and which extend parallel to the axis of the axle 11. Mounted on the tubular portion 43 are discs 46 and 47 which are arranged in alternation thereon. The discs 46 have openings 48 in the centers of the same which just fit the contour of the tubular portion 43. These discs are held from rotation by means of the flats 45 but may move axially along said tubular portion and are hence splined to the disc carrier. The diameter of the discs 46 is slightly less than the diameter of the bore 20 of hub 14 so that said discs may rotate freely relative thereto. The discs 48 have circular holes 49 in the same which support said discs for free rotation on the circular parts of the tubular portion 43 of disc carrier 42. These discs are of the same diameter as the discs 46 but have keys 51 formed thereon which are received in key ways 52 formed in the hub 14 and which extend along the bore 20. These keys may slide along the keyways 52 and are thus splined to said hub. The end disc which in the arrangement shown happens to be one of the discs 46 is adapted to butt up against a shoulder 53 formed on the collar 44.

The clutch mechanism of the invention is indicated at 50 and comprises a movable clutch member 54 having a sleeve 55 which encircles the axle 11 and a neck 67 formed on the driver 27. This sleeve has a conical clutch element 56 at the right hand end thereof as viewed in Fig. 1, which is adapted to engage a complemental clutch element 57 formed in the hub 14 at the end of the bore 20 therein. The surfaces of these clutch elements may be made serrated if desired to increase the holding power of the clutch 50.

Figure 2:
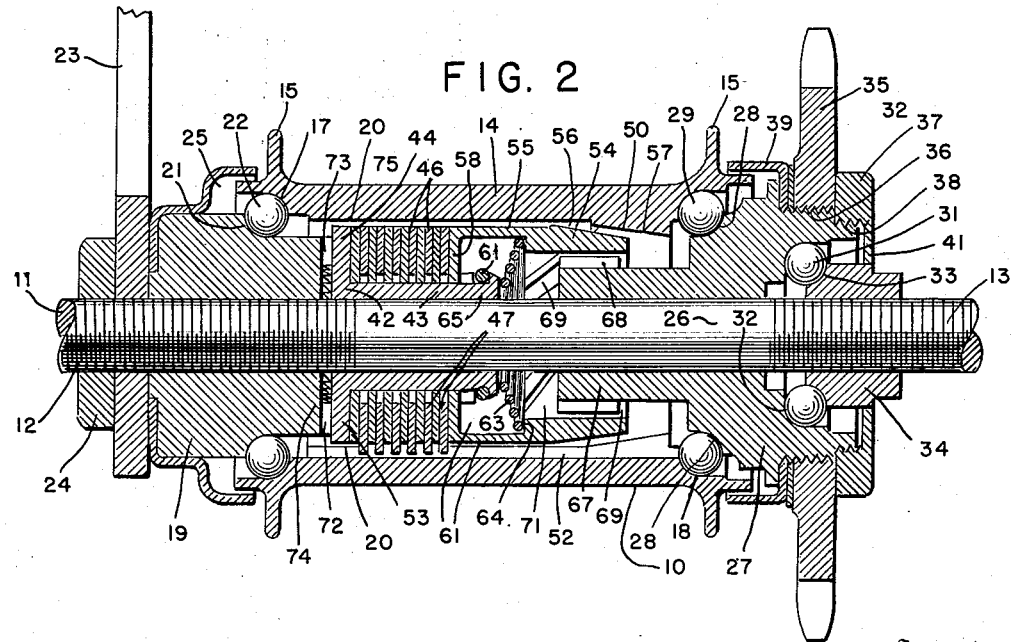
Fig. 2 is a view similar to Fig. 1 showing the parts in altered relation.

Extending inwardly from the sleeve 55 is a flange 58 having a central hole 59 therein of the same size and shape as the hole 48 in clutch disc 46. The end of the tubular portion 43 is adapted to extend through this hole and by means of this construction the sleeve 55 is splined to the disc carrier 42. The sleeve 55 is restrained from axial movement away from the disc carrier 42 by means of a stop 61. This stop is in the form of a split ring which is adapted to be snapped into a shallow annular groove 62 formed in the end of the tubular portion 43 of disc carrier 42. Within the interior of the sleeve 55 is mounted a conical compression coil spring 63 which is seated at one end against a shoulder 64 formed in the clutch member 54 and at its other end against the end 65 of the tubular portion 43. This spring urges the flange 58 against stop 61 moving the clutch member 54 and the carrier 42 apart. The flange 58 has a surface 66 which forms a shoulder adapted to engage the endmost disc and clamp the discs against the shoulder 53 to effect braking, when the clutch member 54 is moved toward the left as shown in Fig. 2.

For procuring relative axial movement of the clutch member 54 the neck 67 of driver 27 is constructed with helical threads 68 which are adapted to engage internal threads 69 on the clutch member 54 and which form a nut indicated in its entirety by the reference numeral 71. The threads 68 and 69 have a fairly great lead so that an appreciable movement of the clutch member 54 is procured upon turning of the driver 27.

In order to resist rotation of the disc carrier 42 during braking, a locking device 72 is employed. This locking device includes axially extending teeth 73 arranged circularly about the axle 11 and formed on the inner end 74 of the brake anchor 19. These teeth are adapted to engage similar teeth 75 formed on the collar 44.

The teeth 74 and 75 have helical surfaces 76 and 77 which have the same hand and lead as the hand and lead of the threads 68 and 69. The said teeth also have surfaces 78 and 79 which lie in planes containing the axis of the axle 11.

The invention operates in the following manner. A certain amount of drag exists between the discs 46 and 47 tending to make the clutch member 54 travel with the hub 14. If the driver 27 is urged to move in a direction tending to procure forward propulsion of the bicycle, threads 68 screw into nut 71 and move the clutch member to the right as viewed in Fig. 1, and the clutch element 56 into engagement with the clutch element 57. At such time the teeth 73 are out of engagement with teeth 75 as seen in Fig. 1. Pedaling may now be engaged in, in the customary manner with the result of forward propulsion of the bicycle. It will be noted that since the clutch member 54 is splined to the disc carrier 42 that these parts rotate as a unit. Since the clutch element 56 is engaged with the clutch element 57, the hub 14, driver 27, clutch member 54, disc carrier 42 and all of the discs 46 and 47 rotate together and without relative movement. Hence while pedaling there is no drag between the brake discs or drag from any drag spring and the only resistance to forward propulsion is the friction in the various ball bearings. If the driver 27 is stopped for the purpose of coasting, the clutch 50 being in engagement, clutch member 54 continues to rotate with hub 14. There is now relative rotation between the nut 71 and threads 68 and the clutch 50 is positively thrown out of engagement. As soon as the clutch element 56 leaves the clutch element 57 the drag between the discs 46 and 47 again tends to cause the clutch member 54 to rotate with the hub 14. Clutch member 54 and disc carrier 42 hence continue axial movement away from the clutch element 57 until the teeth 75 mesh with teeth 73. Due to the fact that the teeth of the locking device have surfaces with the same hand and lead as the hand and lead of the threads 68 and 69 the teeth slide easily into engagement and without attrition between the teeth. The disc carrier 42 and the clutch member 54 now stop and since both the brake anchor 19 and the driver 27 are stationary the disc carrier and clutch member also remain stationary with the locking device 72 engaged. Discs 47 now rotate relative to discs 46 but only the normal drag produced when the brake is disengaged is present. If the driver 27 is thrown in reverse, threads 68 further act on the nut 71 and urge the clutch member further toward the brake anchor 19. Disc carrier 42 due to engagement of the locking device 72 can move no further and flange 58 now moves relative to carrier 42 against the action of spring 63 and is brought into engagement with the juxtaposed disc, clamping the discs together between the shoulders 53 and 58. Since the disc carrier 42 is restrained from movement by means of the locking device 72, braking is effected. In shifting from braking to coasting and from coasting to pedaling the procedure is reversed.

The advantages of my invention are manifest. When pedaling no drag of any kind is present except the friction produced by the bearings. The brake discs travel together and with the hub when pedaling so that no unnecessary wear on the brake discs occurs. Since the locking device becomes effective during coasting and when the clutch is disengaged no appreciable wear on the teeth thereof results. My improved coaster brake may be constructed at no greater cost than other coaster brakes not having the advantages of my invention. Take up for wear on the brake discs becomes unnecessary with my invention. The clutch member and brake assembly may be installed and removed as a unit and by employing a special brake anchor may be substituted for the conventional clutch and brake elements.

Having described my invention what I claim as new and desire to protect by Letters Patent is:

1. In a coaster brake an axle, a hub encircling said axle and rotatable relative thereto, a brake anchor at one end of said hub, a clutch element on said hub at the other end thereof, a driver rotatable relative to said axle and disposed at the said other end of said hub, threads on said driver, a brake disc carrier axially movable and rotatable relative to said axle, brake discs on said carrier, acting between said carrier and hub, locking means between said disc carrier and brake anchor, engageable upon axial movement of the brake carrier toward said brake anchor, a clutch member encircling said axle and disposed between said driver and brake disc carrier and adapted to engage the clutch element on said hub upon axial movement away from said brake anchor, a nut on said clutch member engageable with the threads on said driver and adapted to move axially upon relative rotation between said threads and nut, a shoulder on said brake carrier adapted to resist pressure on said discs when said locking means is engaged, a shoulder on said clutch member adapted to exert pressure on said discs when the clutch member is moved toward said brake anchor, withdrawing means acting between said clutch member and brake disc carrier for moving said carrier away from said anchor and disengaging said locking means upon movement of said clutch member into clutch engaging position, resilient means acting between said carrier and clutch member and urging said shoulders apart to free said brake discs and stop means between said clutch member and carrier limiting movement of said shoulders away from one another and causing said clutch member and carrier to move axially relative to said axle as a unit to first bring said locking means into engagement and thereafter clamp the brake discs between said shoulders upon relative rotation of said nut and driver in one direction.

2. In a coaster brake an axle, a hub encircling said axle and rotatable relative thereto, a brake anchor at one end of said hub, a clutch element on said hub at the other end thereof, a driver rotatable relative to said axle and disposed at the said other end of said hub, threads on said driver, a brake disc carrier axially movable and rotatable relative to said axle, said carrier having a tubular portion and a collar at the end thereof adjacent said anchor, brake discs on said tubular portion acting between said carrier and hub, locking means between said collar and anchor engageable upon axial movement of said disc carrier toward said anchor, a sleeve encircling said threads and the end of said tubular portion, a clutch element on said sleeve at one end thereof engageable with the clutch element on said hub, threads on said sleeve forming a nut engageable with the threads on said driver, a flange on said sleeve at the end thereof opposite said clutch element and extending inwardly toward said tubular portion, stop means on said tubular portion for engagement with said flange to limit axial movement of said sleeve away from said brake disc support said sleeve upon rotation of said driver in one direction relative thereto urging said flange toward said collar and clamping said brake discs therebetween to set the brake and resilient means resisting movement of the flange toward the collar and urging the flange into engagement with said stop means.

3. In a coaster brake an axle, a hub encircling said axle and rotatable relative thereto, a brake anchor at one end of said hub, a clutch element on said hub at the other end thereof, a driver rotatable relative to said axle and disposed at the said other end of said hub, threads on said driver, a brake disc carrier axially movable and rotatable relative to said axle, said carrier having a tubular portion and a collar at the end thereof adjacent said anchor, brake discs on said tubular portion acting between said carrier and hub, locking means between said collar and anchor engageable upon axial movement of said disc carrier toward said anchor, a sleeve encircling said threads and the end of said tubular portion, a clutch element on said sleeve at one end thereof engageable with the clutch element on said hub, threads on said sleeve forming a nut engageable with the threads on said driver, a flange on said sleeve at the end thereof opposite said clutch element and extending inwardly toward said tubular portion, stop means on said tubular portion for engagement with said flange to limit axial movement of said sleeve away from said brake disc support, said sleeve upon rotation of said driver in one direction relative thereto urging said flange toward said collar and clamping said brake discs therebetween to set the brake, said sleeve having an internal shoulder facing said flange, and a compression coil spring within said sleeve seated at one end against said shoulder and at its other end against a part restrained from axial movement relative to said disc carrier to urge said flange against said stop means.

THEODORE K. CROSSLAND.

REFERENCES CITED

The following references are of record in the file of this patent:

UNITED STATES PATENTS

| Number | Name | Date |
| --- | --- | --- |
| 2,091,586 | Glacy | Aug. 31, 1937 |